US009233582B2

(12) United States Patent
Hinque et al.

(10) Patent No.: US 9,233,582 B2
(45) Date of Patent: Jan. 12, 2016

(54) SELF-INFLATING TIRE WITH INLET CONTROL VALVE (71) Applicant: The Goodyear Tire & Rubber Company, Akron, OH (US)

(72) Inventors: Daniel Paul Luc Marie Hinque, Habay-la-Neuve (BE); Anne Therese Peronnet-Paquin, Luxembourg (LU); Gauthier Piret, Ster-Francorchamps (BE); William Alain Talbot, Bastogne (BE); Yannick Raymond Georges Haegel, Villeneuve d'ascq (FR)

(73) Assignee: The Goodyear Tire & Rubber Company, Akron, OH (US)

( * ) Notice: Subject to any disclaimer, the term of this patent is extended or adjusted under 35 U.S.C. 154(b) by 146 days.

(21) Appl. No.: 14/108,686

(22) Filed: Dec. 17, 2013

(65) Prior Publication Data
US 2015/0165839 A1 Jun. 18, 2015

(51) Int. Cl.
*B60C 23/12* (2006.01)

(52) U.S. Cl.
CPC ......... *B60C 23/12* (2013.01); *Y10T 152/10495* (2015.01)

(58) Field of Classification Search
CPC ........................................................ B60C 23/12
See application file for complete search history.

(56) References Cited

U.S. PATENT DOCUMENTS

| 8,156,978 | B1 | 4/2012 | Hinque et al. |
| 8,291,950 | B2 | 10/2012 | Hinque et al. |
| 8,573,270 | B2 | 11/2013 | Hinque |
| 8,651,155 | B2 | 2/2014 | Hinque et al. |
| 8,656,972 | B2 | 2/2014 | Hinque et al. |
| 8,662,127 | B2 | 3/2014 | Hinque et al. |
| 8,701,726 | B2 | 4/2014 | Hinque |
| 8,820,369 | B2 | 9/2014 | Hinque et al. |
| 8,852,371 | B2 | 10/2014 | Hinque et al. |
| 8,857,484 | B2 | 10/2014 | Hinque |
| 8,915,277 | B2 | 12/2014 | Hinque et al. |
| 2012/0090752 | A1 | 4/2012 | Hinque et al. |
| 2012/0160386 | A1 | 6/2012 | Hinque et al. |
| 2012/0241063 | A1 | 9/2012 | Hinque et al. |
| 2012/0241064 | A1 | 9/2012 | Hinque et al. |
| 2013/0048176 | A1* | 2/2013 | Hinque .......... 152/450 |
| 2013/0048177 | A1 | 2/2013 | Hinque |
| 2013/0048178 | A1 | 2/2013 | Hinque |
| 2013/0112328 | A1 | 5/2013 | Hinque et al. |
| 2013/0112329 | A1 | 5/2013 | Hinque et al. |
| 2013/0160917 | A1 | 6/2013 | Hinque et al. |
| 2013/0160927 | A1 | 6/2013 | Hinque et al. |

(Continued)

FOREIGN PATENT DOCUMENTS

| EP | 2565059 A2 | 3/2013 |
| EP | 2565061 A1 | 3/2013 |
| EP | 2881269 A1 | 6/2015 |

*Primary Examiner* — Brodie Follman
*Assistant Examiner* — Erez Gurari
(74) *Attorney, Agent, or Firm* — June E. Rickey (57) ABSTRACT

A self-inflating tire assembly includes an air tube connected to a tire and defining an air passageway, the air tube being composed of a flexible material operative to allow an air tube segment opposite a tire footprint to flatten, closing the passageway, and resiliently unflatten into an original configuration. The air tube is sequentially flattened by the tire footprint in a direction opposite to a tire direction of rotation to pump air along the passageway to a regulator device. The regulator device regulates the inlet air flow to the air tube and the outlet air flow to the tire cavity.

11 Claims, 13 Drawing Sheets

(56) References Cited

U.S. PATENT DOCUMENTS

2013/0160928 A1 6/2013 Hinque et al.
2013/0160931 A1 6/2013 Sportelli et al.
2014/0174619 A1 6/2014 Hinque

* cited by examiner

SELF-INFLATING TIRE WITH INLET CONTROL VALVE

FIELD OF THE INVENTION

The invention relates generally to self-inflating tires and, more specifically, to a pump mechanism and pressure regulator for such tires.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is desirable, therefore, to incorporate a self-inflating feature within a tire that will self-inflate the tire in order to compensate for any reduction in tire pressure over time without the need for driver intervention. It is also desired to provide a valve system in order to regulate the tire pressure.

SUMMARY OF THE INVENTION

The invention provides in a first aspect a self-inflating tire assembly including a tire mounted to a rim, the tire having a tire cavity, first and second sidewalls extending respectively from first and second tire bead regions to a tire tread region; an air passageway having an inlet end and an outlet end, the air passageway being composed of a flexible material operative to open and close when the tire rotates, a regulator device, the regulator device including a regulator body, wherein the regulator body has an interior chamber; a pressure membrane being mounted in the interior chamber and positioned to open and close an outlet port mounted in the chamber, wherein the pressure membrane is in fluid communication with the tire cavity pressure; wherein the outlet port of the regulator device is in fluid communication with the inlet end of the air passageway; said interior chamber being in fluid communication with an outside air supply; wherein the air passageway outlet end is in fluid communication with the tire cavity.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of a surface, perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
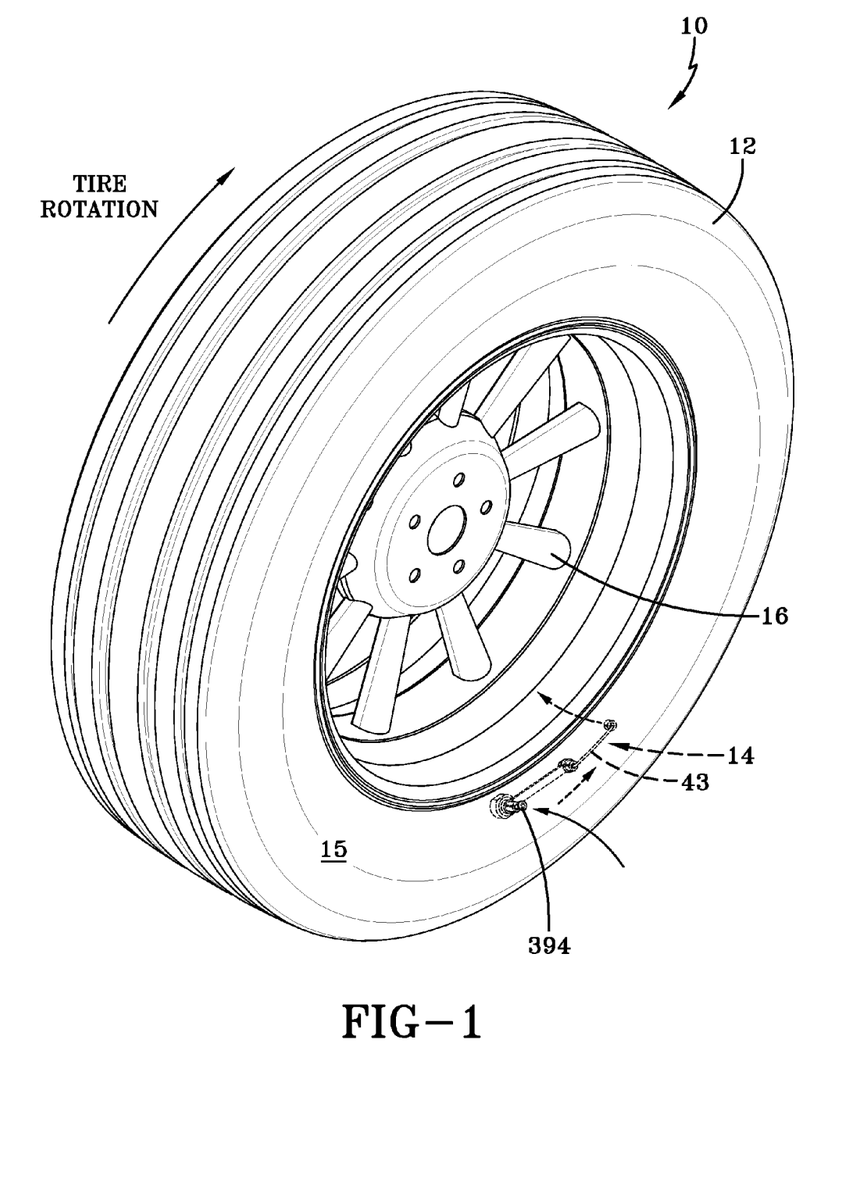
FIG. 1 is an isometric view of a tire and rim assembly showing a pump and an inlet regulator valve assembly.
Figure 2:
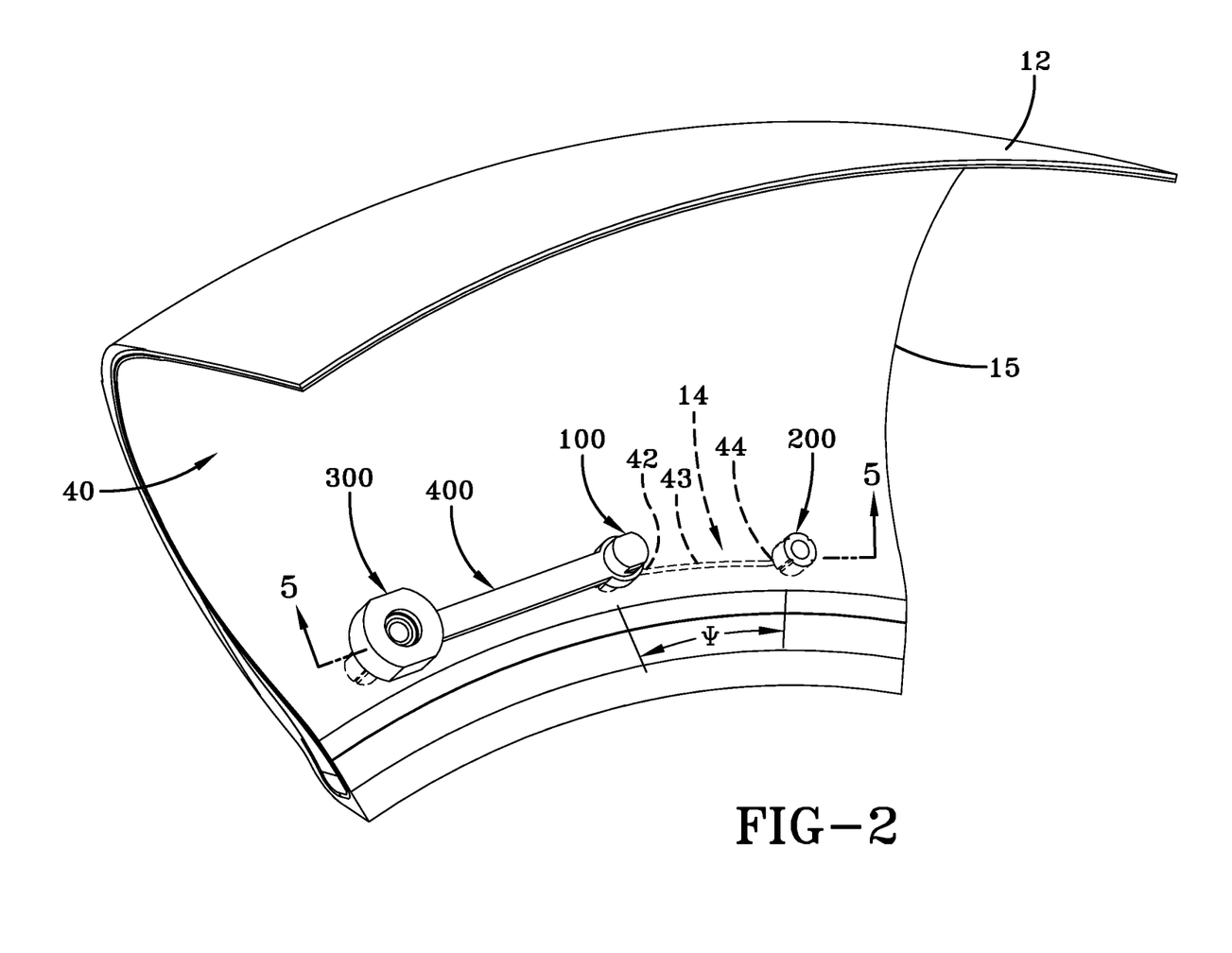
FIG. 2 is a front view of the pump and inlet regulator valve assembly as shown from inside the tire of FIG. 1.
Figure 3:
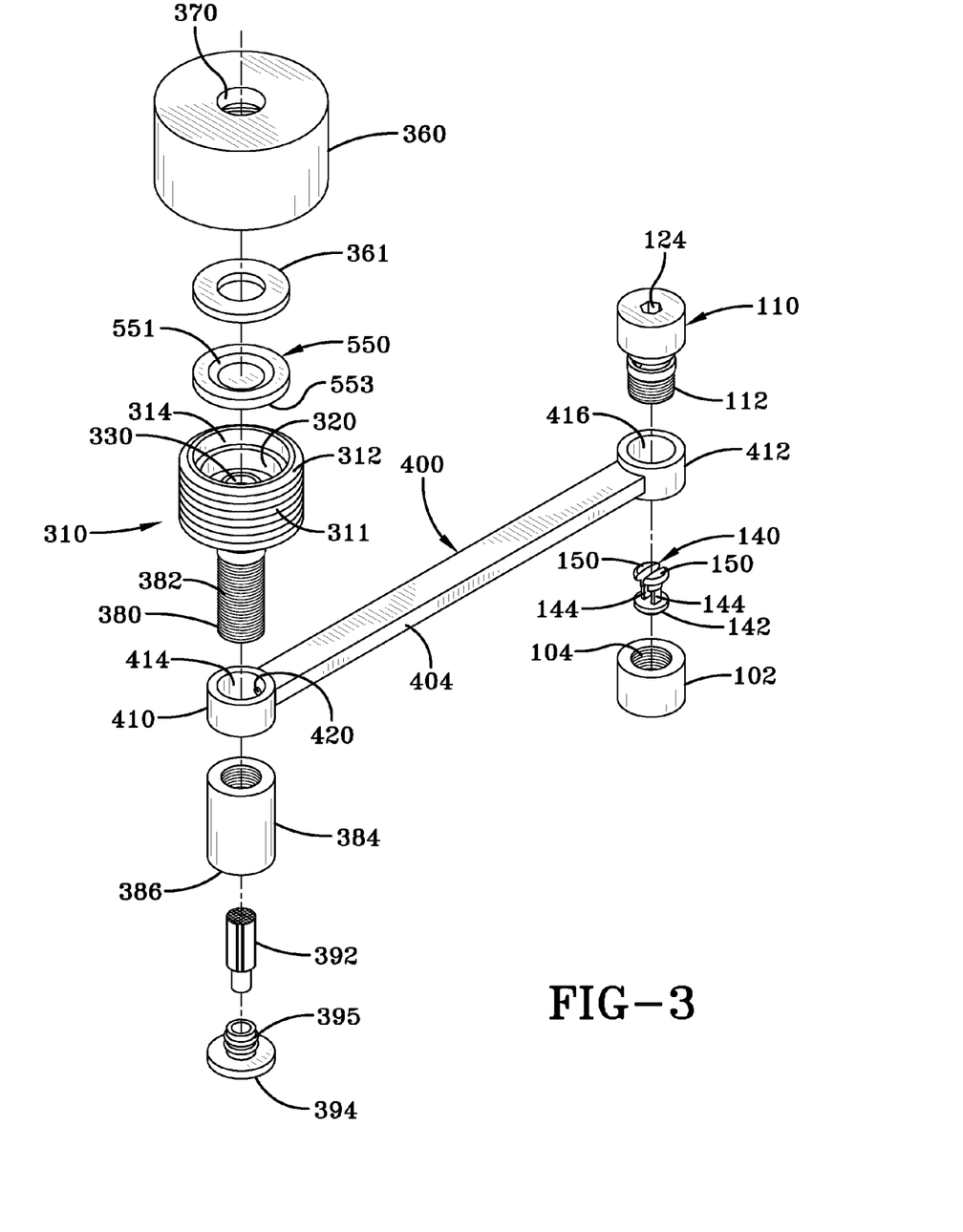
FIG. 3 is an exploded view of the inlet regulator valve assembly of FIG. 2.
Figure 4:
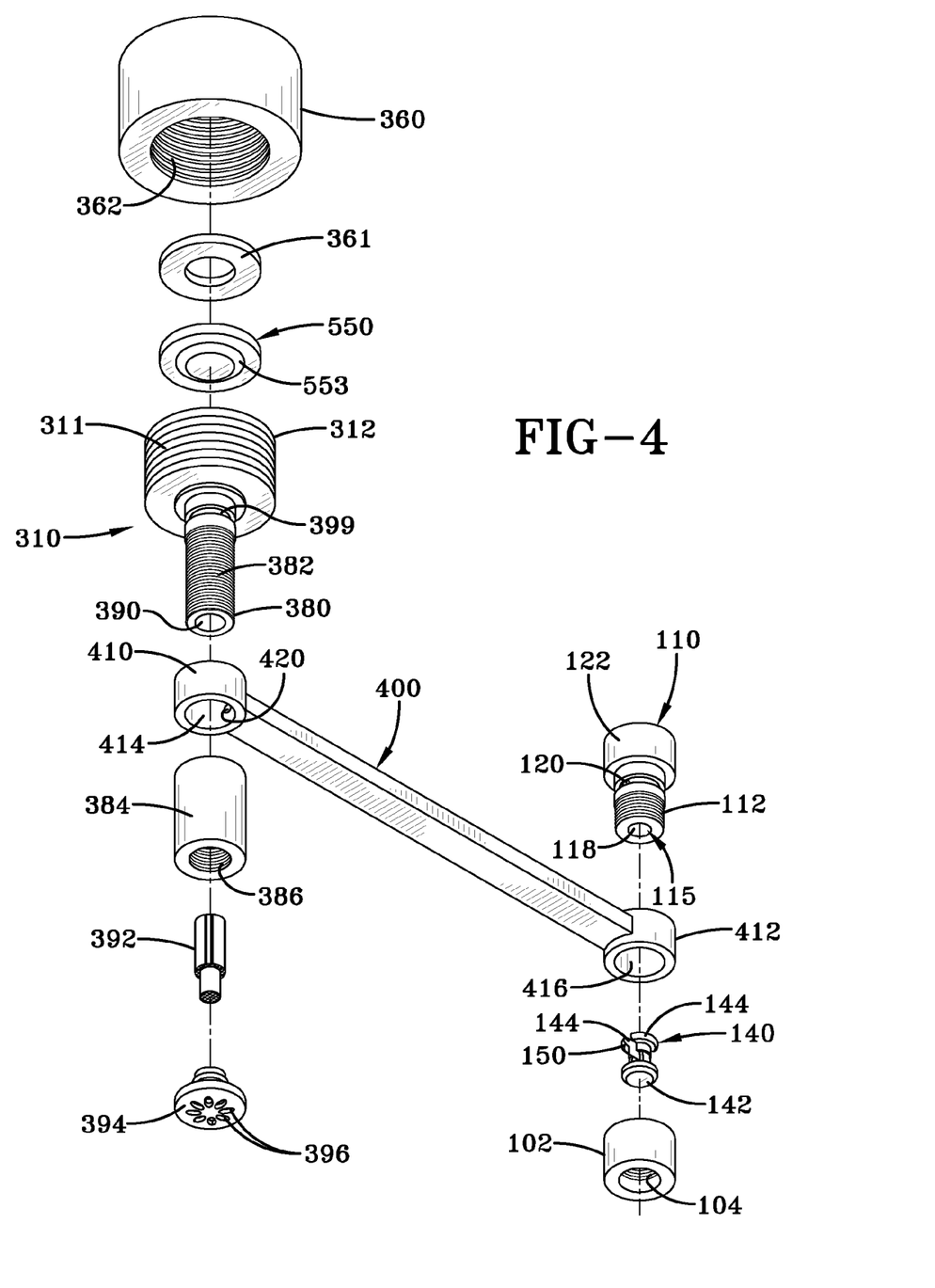
FIG. 4 is an exploded view of the inlet regulator valve assembly of FIG. 3, as viewed from below.

Referring to FIGS. 1 and 2, a tire assembly 10 includes a tire 12, a pump assembly 14, and a tire rim 16. The tire and rim enclose a tire cavity 40. As shown in FIGS. 1-2, the pump assembly 14 is preferably mounted into the sidewall area 15 of the tire, preferably near the bead region.

Pump Assembly 14

Figure 11:
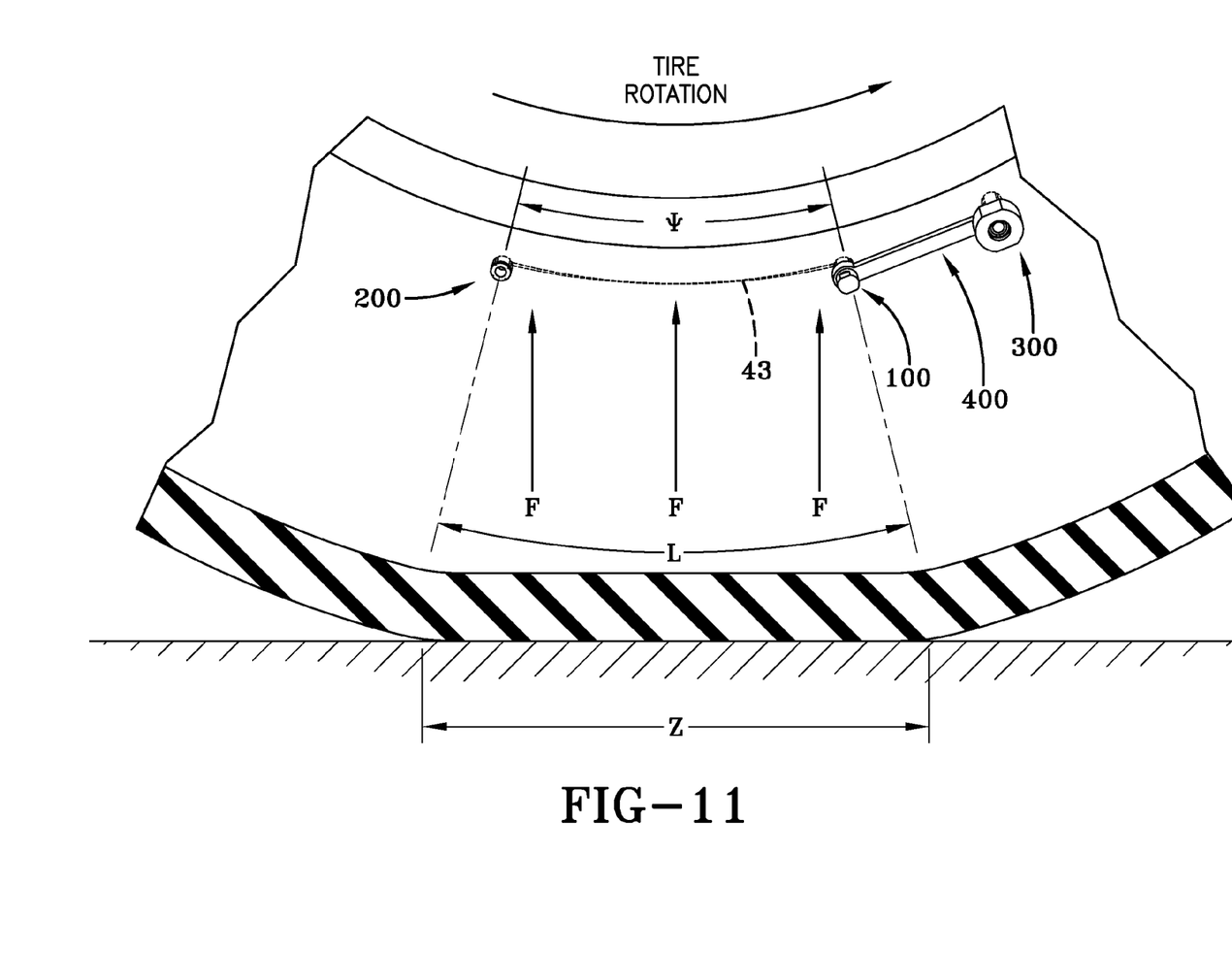
FIG. 11 illustrates the system during tire rotation.
Figure 12:
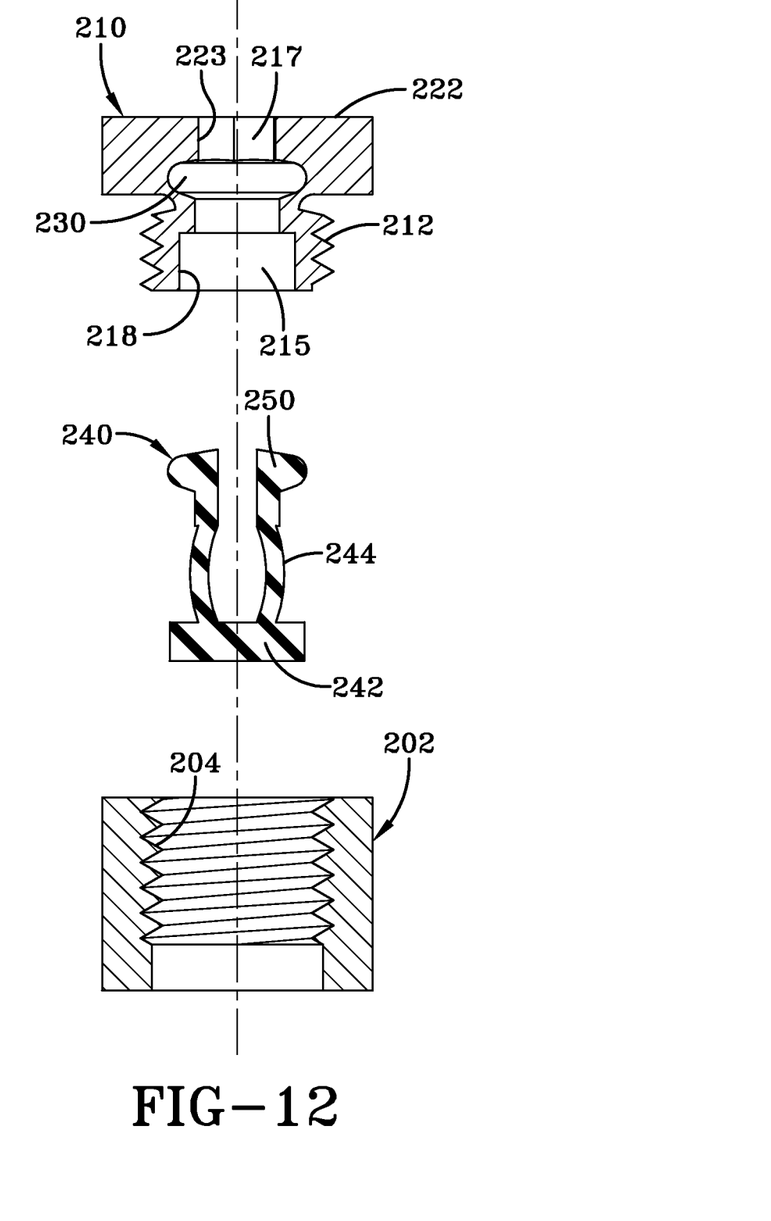
FIG. 12 is an exploded view of the outlet valve.

The pump assembly 14 includes an air passageway 43 which may be molded into the sidewall of the tire during vulcanization or molded or formed post cure. The air passageway has an arc length L, wherein the arc length is measured by angle $\Psi$ that is measured from the center of rotation of the tire. In a first embodiment, the angle $\Psi$ may range, and is preferably in the range of about 15-50 degrees or optionally, an angular length sufficient to extend the length of the tire footprint Z, as shown in FIG. 11. The pump air passageway 43 is comprised of an inserted tube body or a passageway formed in the tire wall. For example, the tube may be molded in the tire into a desired shape by the presence of a removable strip that forms the passageway when removed. If the passageway 43 is a inserted tube body, it should be formed of a resilient, flexible material such as plastic, elastomer or rubber compounds, and be capable of withstanding repeated deformation cycles when the tube is deformed into a partially flattened condition or a completely flattened condition subject to external force and, upon removal of such force, returns to an original condition. The tube is of a diameter sufficient to operatively pass a volume of air sufficient for the purposes described herein and allowing a positioning of the tube in an operable location within the tire assembly as will be described. Preferably, the tube or air passageway has a circular cross-sectional shape, although other shapes such as elliptical may be utilized. Preferably, the air passageway is located inside the tire sidewall.

The pump passageway 43 has an inlet end 42 connected to an optional inlet check valve 100, and an outlet end 44 that is connected to an outlet check valve 200. The inlet check valve 100 is in fluid communication with an inlet control valve 300.

Inlet Control Valve 300

The inlet control valve 300 is shown in FIGS. 3-7. The inlet control valve 300 functions to regulate the flow of air to the pump 14. If the tire is determined by the inlet control valve to need additional air, the inlet control valve will allow air to enter the system. The inlet control valve 300 has a T shaped valve housing 310. At the upper end 312 of the T shaped housing there is an interior chamber 320. The interior chamber 320 has a central opening 314. Opposite the central opening 314 is an outlet port 330. The outlet port is raised from the bottom surface 313 and extends into the interior of the chamber 320. The outlet port 330 is positioned to engage a pressure membrane 550. The pressure membrane 550 is positioned within a recessed slot 340 formed in the sidewall 315 of the interior chamber 320. The pressure membrane is a disk shaped member made of a flexible material such as, but not limited to, rubber, elastomer, plastic or silicone. The pressure membrane is operable to open and close the outlet port 330. The outer surface 551 of the pressure membrane is in fluid communication with the pressure of the tire chamber 40 via central opening 314 and via the cap hole 370. The lower surface 553 of the pressure membrane is in fluid communication with the inlet air supplied from the distal end 380 of the inlet control valve, as described in more detail, below. Thus the balance of pressure forces on each side of the pressure membrane actuates the pressure membrane to open and close the outlet port 330. A cap 360 is received over the upper end 312 of the valve housing 310. The cap has an interior threaded surface 362 that is secured to the outer threaded surface 311 of the upper end of the valve housing. The cap 360 has an opening 370 that is aligned with central opening 312 so that pressure membrane is in fluid communication with the tire cavity 40. An optional washer 361 is received between the pressure membrane and the cap.

Figure 5:
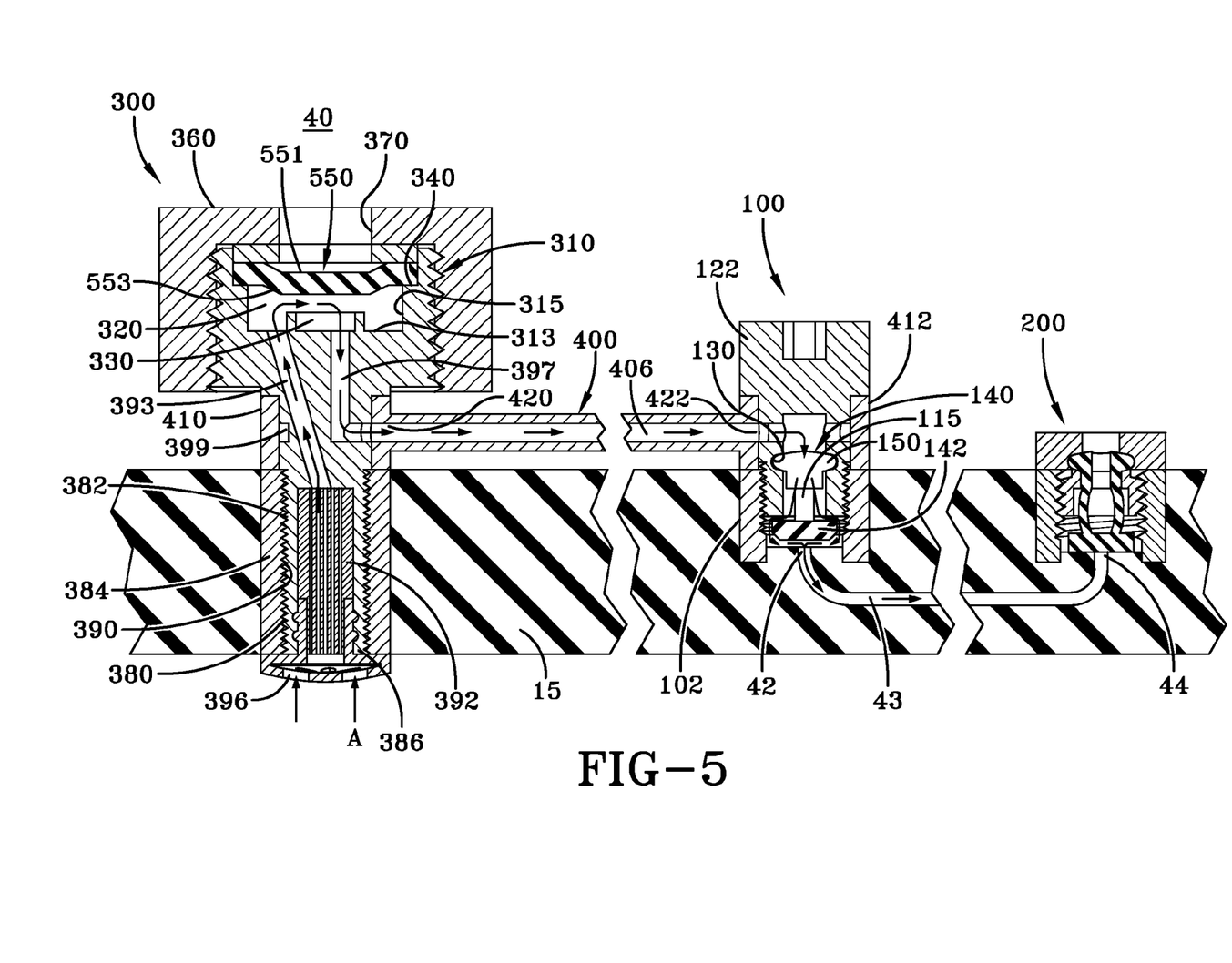
FIG. 5 is a section view of FIG. 2 in the direction 5-5 showing the inlet regulator valve assembly in operation during pumping.
Figure 6:
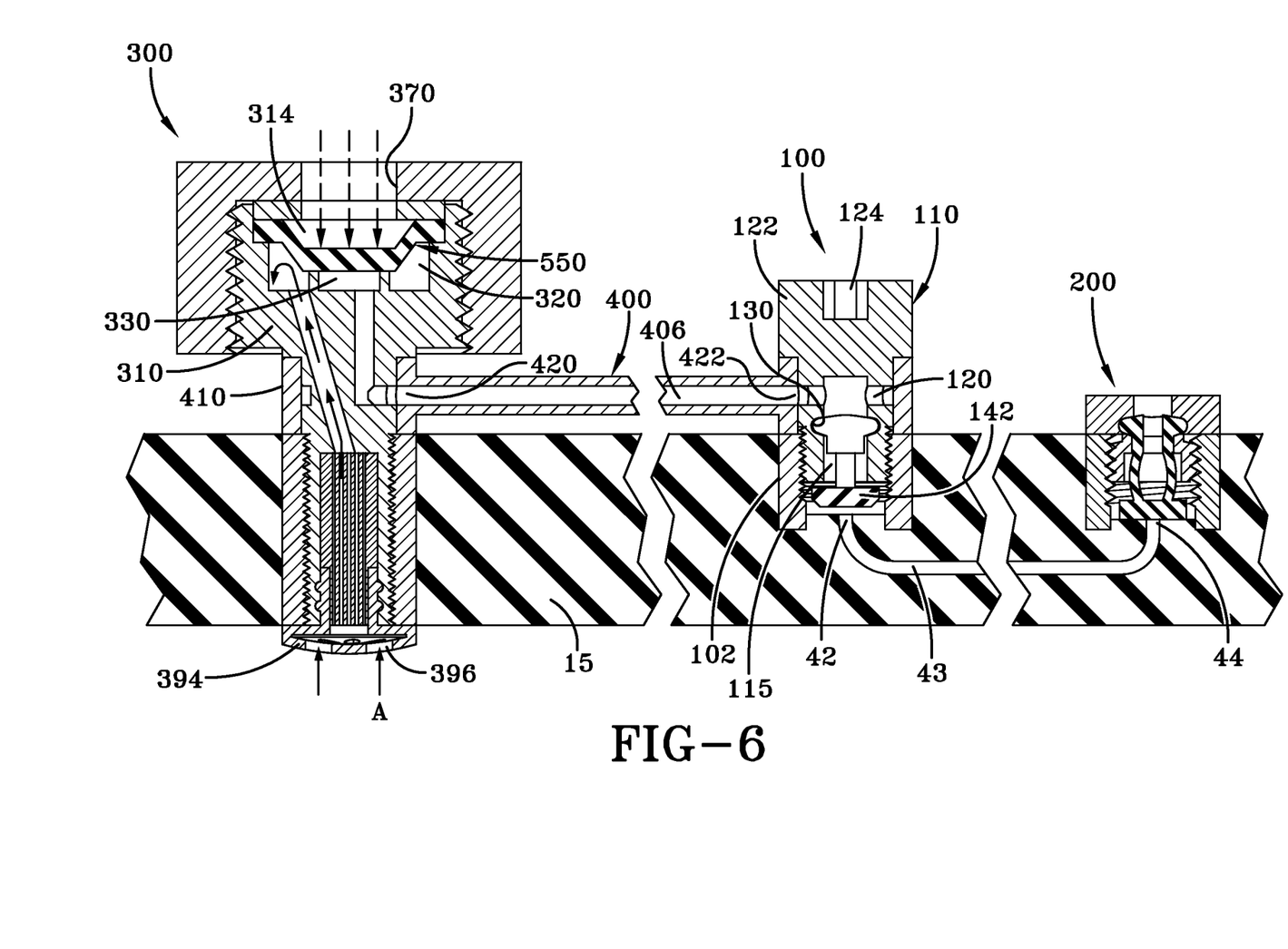
FIG. 6 illustrates the system of FIG. 5 shown when the inlet regulator valve is closed.

The distal end 380 of the inlet control valve housing has an outer threaded surface 382 that is received in insert sleeve 384. The insert sleeve is preferably inserted into the tire post cure or may be molded into the tire as shown in FIG. 5. Preferably the insert sleeve 384 is permanently affixed in the tire sidewall 15. A first opening 386 of the insert sleeve 384 is preferably flush with the tire outer sidewall 15.

The distal end 380 of the inlet control valve housing has an internal cavity 390 for receiving a filter 392. A filter cap 394 has a threaded end 395 that is received in the opening 391 of the internal cavity 390. The filter cap 394 is positioned on the outside surface of the tire, typically on the tire sidewall as shown in FIG. 1. The filter cap is received in the opening 391 and has a plurality of holes 396 for allowing the flow of air into the filter 392. Outside air enters hole 396 and then proceeds through the filter 392. As shown in FIG. 5, the filtered air exits the filter 392 into an internal passageway 393 that extends from the internal cavity 390 to the internal chamber 320.

If the tire pressure is lower than the target pressure, the pressure membrane 550 will not block the central opening 330 of the internal chamber 320. Filtered air from the first internal passageway 393 may flow through central opening 330 and then into an exit channel 397 having an exit 399 that is in fluid communication with the interior channel 406 of the flexible duct.

Figure 8:
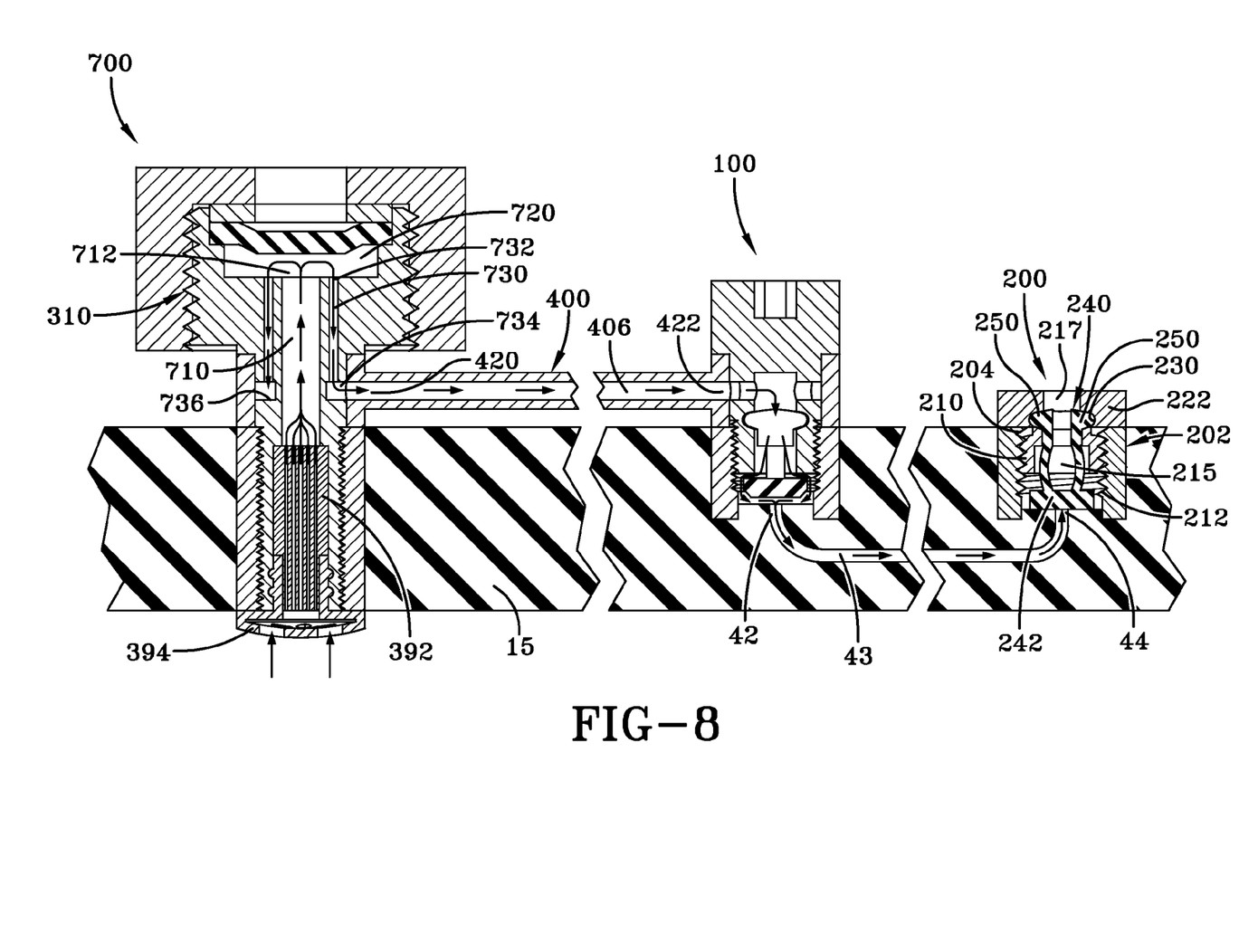
FIG. 8 is a section view showing an alternate embodiment of an inlet regulator valve assembly in operation during pumping.
Figure 9:
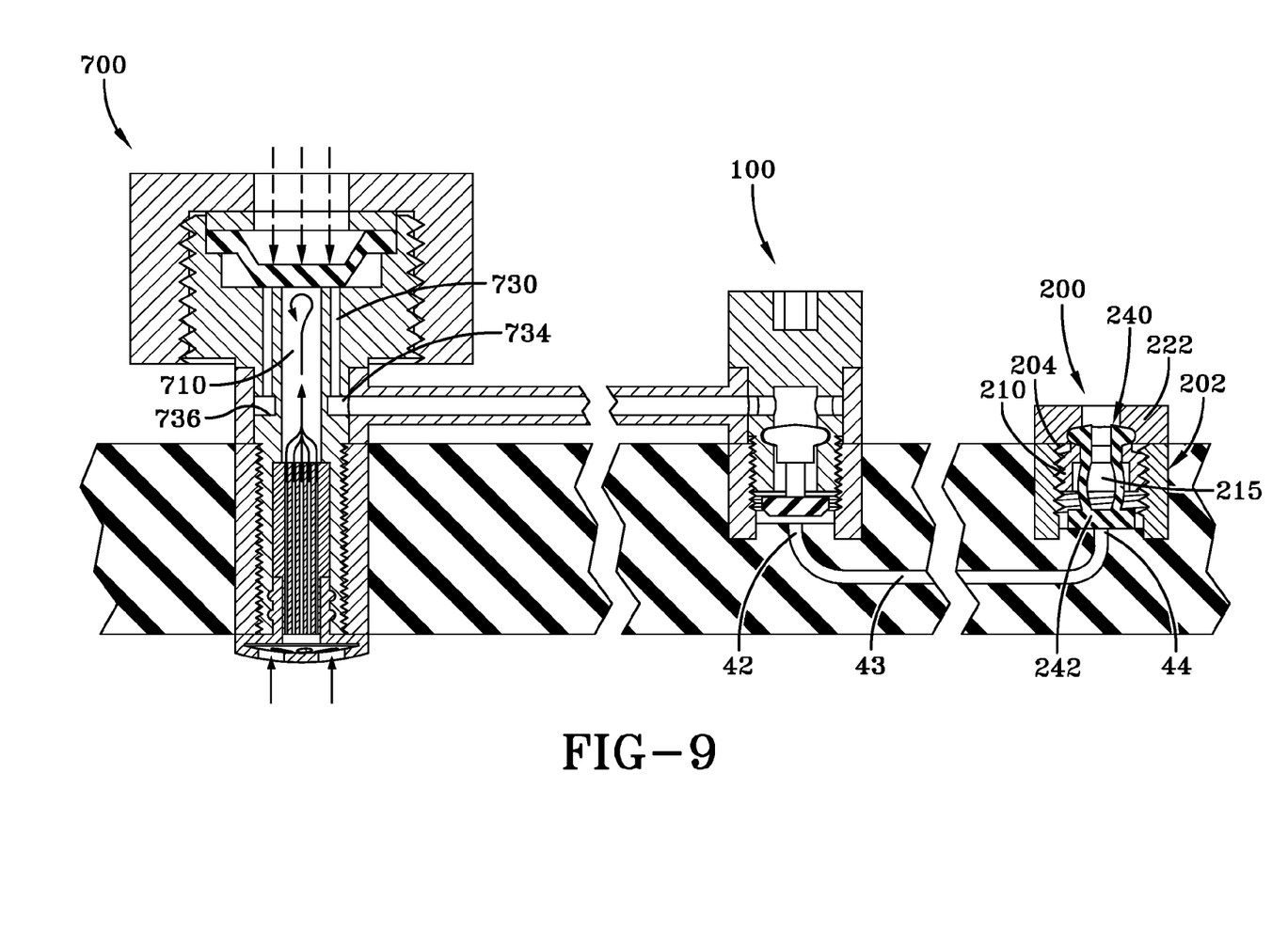
FIG. 9 illustrates the system of FIG. 8 shown when the inlet regulator valve is closed.
Figure 10:
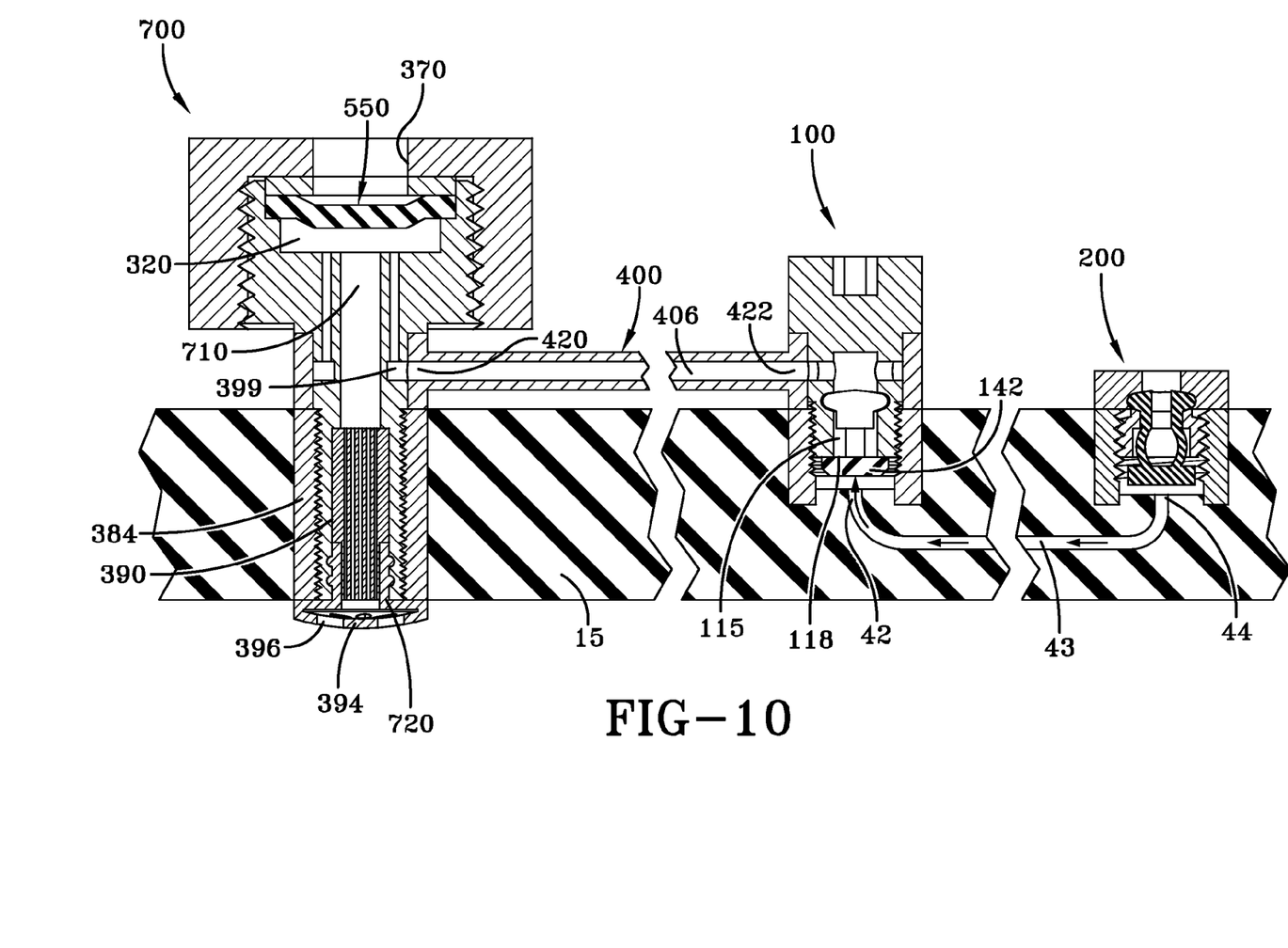
FIG. 10 illustrates the system of FIG. 8 shown when the inlet check valve is closed.

A second embodiment 700 of the inlet control valve is shown in FIGS. 8-10. The main difference between the second embodiment 700 and the first embodiment 300 is the channel which is plugged by the membrane. In the first embodiment, the channel plugged by the membrane is in fluid communication with the pump. In the second embodiment, the channel plugged by the membrane is coming from the filter. The inlet control valve 700 is the same as the inlet control valve 300 described above, except for the following differences. Internal passageway 393 and exit channel 397 have been eliminated. The T shaped regulator housing 310 has a central channel 710 that has a first end 712 that opens to the interior chamber 720. The pressure membrane positioned in the interior chamber 720 is positionable over the opening 712. A filter 392 is positioned in the channel 710 and is secured within the channel 710 with a filter cap 394. The inlet control valve 700 further includes an exit passageway 730 that has a first end 732 that opens to the interior chamber 720, and a second end 734 that is in fluid communication with the first end 420 of a flexible duct 400. The passageway 730 may be annular in shape. An annular notch 736 surrounds the second end 734 of the exit passageway 734.

Flexible Duct 400

A flexible duct 400 has an interior channel 406 that extends to two opposed flanged ends 410, 412. The interior channel 406 is useful for communicating fluid from the inlet pressure regulator to the inlet check valve 100, or between two or more devices. Each flanged end 410, 412 is circular for reception about the body of the inlet control valve 300 and the body of the inlet check valve, respectively. Each flanged end 410, 412 has a hole therethrough 414, 416 respectively. The interior channel 406 has a first end 420 that terminates in the first flanged end 410, and a second end 422 that terminates in the second flanged end 412. The first flanged end 410 is received about the T shaped housing 310 of the inlet control valve 300. The second flanged end 412 is received about the housing of the inlet check valve 100. The flexible duct 400 may be integrally formed with the inlet control valve housing, or be a discrete part connected to the central housing 310.

Inlet Check Valve 100

An inlet check valve 100 that communicates with the inlet control valve 300 is shown in FIGS. 3-7. The inlet check valve 100 includes an insert sleeve 102 that is inserted into the tire on an interior surface, typically the inner sidewall as shown in FIG. 5. The insert sleeve 102 has an internal threaded bore 104. The insert sleeve 102 may be molded into the tire 12 or inserted post cure. The insert is installed in the tire area so that the internal bore 104 is in fluid communication with an inlet end 42 of the pump passageway 43. A valve body 110 has an outer threaded surface 112 that is received within insert 102. The valve body 110 has a central passage 115 that has a first opening 118 that is in fluid communication with the insert sleeve bore 104 and the pump passageway 43 inlet end 42 when inserted into the tire. The central passage 115 has two opposed holes 120 near the head 122 of the valve body 110. The head 122 has a hex head bore 124 (or any screwdriver slot shape) for receiving an allen wrench useful for tightening the valve body 110 inside the sleeve 102. The central passage 115 further includes a retainer slot 130 for receiving flexible stopper 140. The flexible stopper 140 is preferably made of a resilient material such as rubber, silicone, or an elastomer. The flexible stopper 140 has a disk shaped lower end 142, and two opposed legs 144 which extend from the lower end 142. Each leg 144 has a shoe 150 which has a curved enlarged shape and is made of a resilient material. As shown, the shoe is a semi-circle, although other shapes would work for the invention. Although the flexible stopper 140 is shown with two legs 144, the stopper could have a single leg 144 with a shoe thereon, and the shoe could be annular with holes that allow passage of air therethrough.

The disk shaped lower end 142 of the flexible stopper is seated on the valve body distal end and the legs 144 extend into the passage 115. Each shoe 150 is received in the annular retainer slot 130. The disk lower end 142 is positioned to seal the opening 118 of the central passage 115 as shown in FIG. 7.

Figure 7:
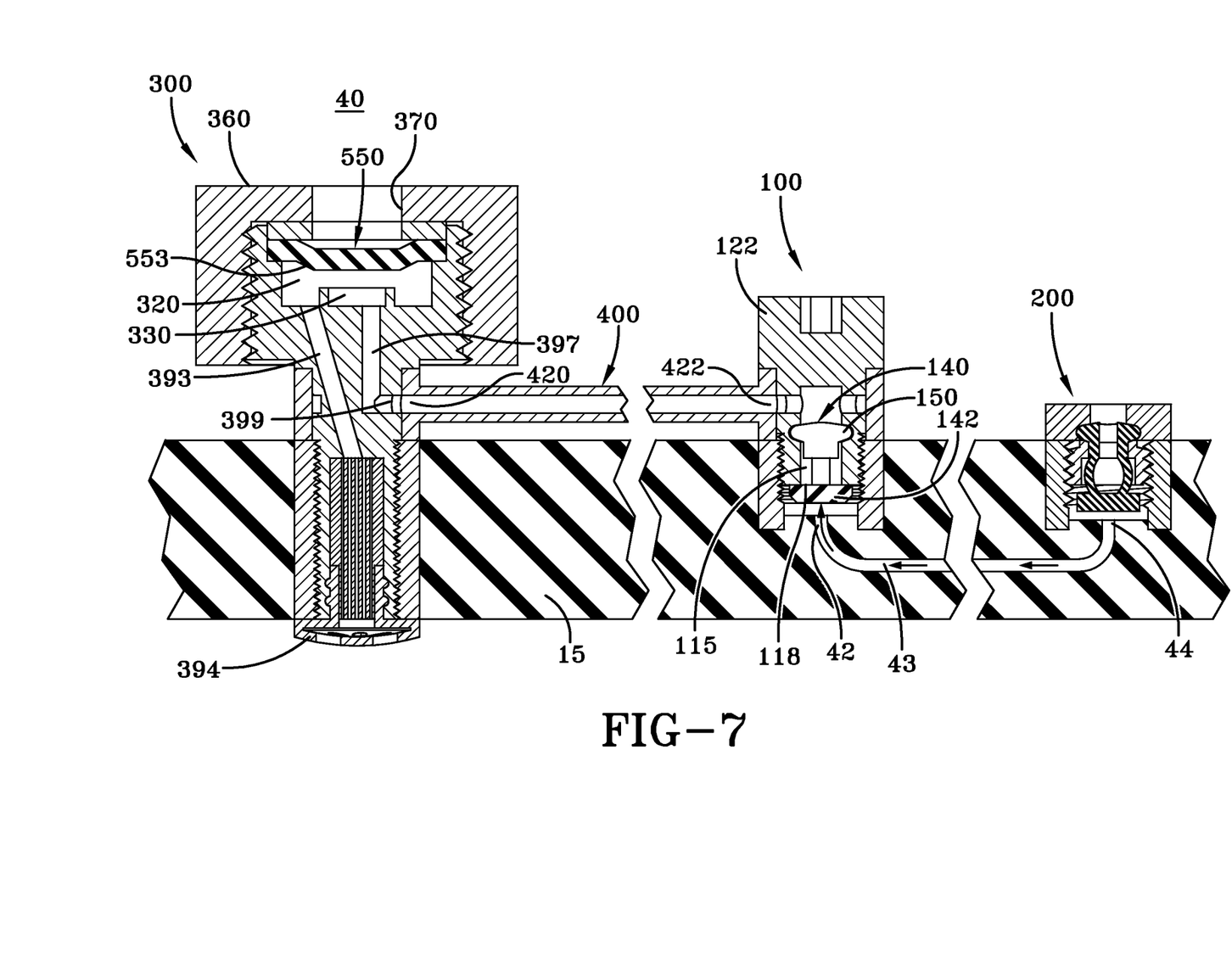
FIG. 7 illustrates the system of FIG. 5 shown when the inlet check valve is closed.

FIGS. 7-8 illustrate the regulator check valve 100 installed and operational. FIG. 8 illustrates flow from the inlet control valve 300, through the check valve 100 and to the pump inlet 42. The disk lower end 142 of the flexible stopper 140 does not seal the central passage 115 when the flow direction is towards the pump 43. FIG. 7 illustrates the disk lower end 142 of the flexible stopper 140 sealing the passageway 115 so that no flow travels in the reverse direction from the pump to the inlet control valve 300.

Pump Outlet Check Valve

As described above, a first end 42 of the pump is in fluid communication with an inlet control valve 300 and a check valve 100. The second end 44 of the pump is connected to a pump outlet valve 200. The pump outlet valve is shown in FIGS. 12, 13A-C. The pump outlet valve 200 includes an insert sleeve 202 that is inserted into the tire on an interior surface, typically the inner sidewall. The insert sleeve 202 has an internal threaded bore 204. The insert sleeve 202 may be molded into the tire 12 or inserted post cure. The insert is installed in the tire area so that the internal bore 204 is in fluid communication with the pump outlet end 44. A valve body 210 has an outer threaded surface 212 that is received within insert 202. The valve body 210 has a central passage 215 that has a first opening 218 that is in fluid communication with the insert sleeve bore 204 and the pump passageway 43 outlet end 44 when inserted into the tire. The central passage 215 has an outlet end 217 that is in fluid communication with the tire cavity. The valve body has a head 222 having a hex head bore 224 (or any screwdriver slot shape) for receiving an allen wrench useful for tightening the valve body 210 inside the sleeve 202. The central passage 215 further includes a retainer slot 230 for receiving the flexible stopper 240. The flexible stopper 240 is preferably made of a resilient material such as rubber, silicone, or an elastomer. The flexible stopper 240 has a disk shaped lower end 242, and two opposed legs 244 which extend from the lower end 242. Each leg 244 has a shoe 250 which has a curved enlarged shape and is made of a resilient material. As shown, the shoe is a semi-circle, although other shapes would work for the invention. Although the flexible stopper 240 is shown with two legs 244, the stopper could have a single leg 244 with a shoe thereon, and the shoe could be annular with holes that allow passage of air therethrough.

The flexible stopper is mounted inside the central passage so that each shoe 250 of the flexible stopper is received in the annular retainer slot 230, and the disk lower end 242 is positioned to open and close the pump end 44.

Figure 13A:
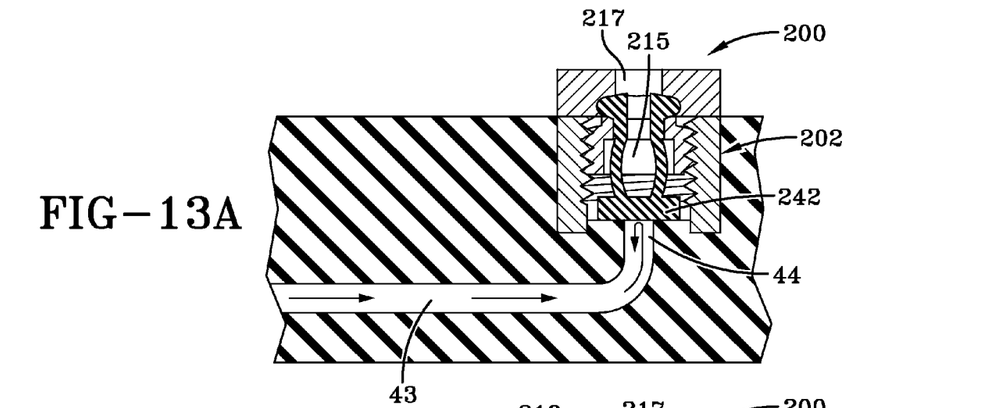
FIG. 13A, B, C illustrates the outlet valve closed, during cracking and open, respectively.
Figure 13B:
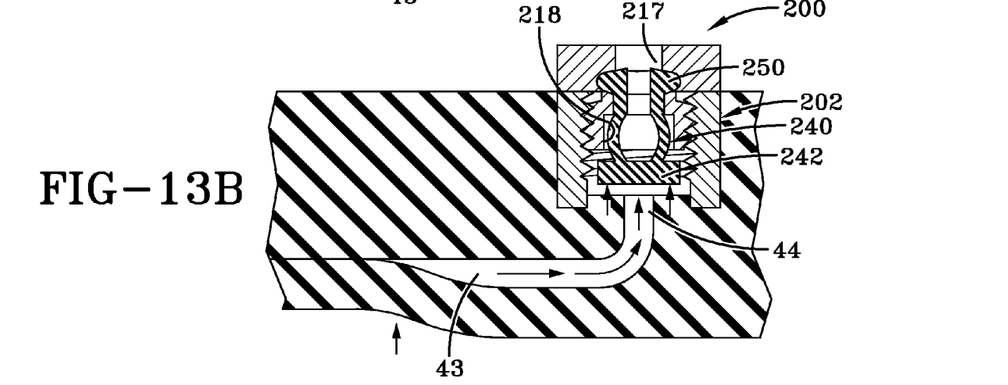
Figure 13C:
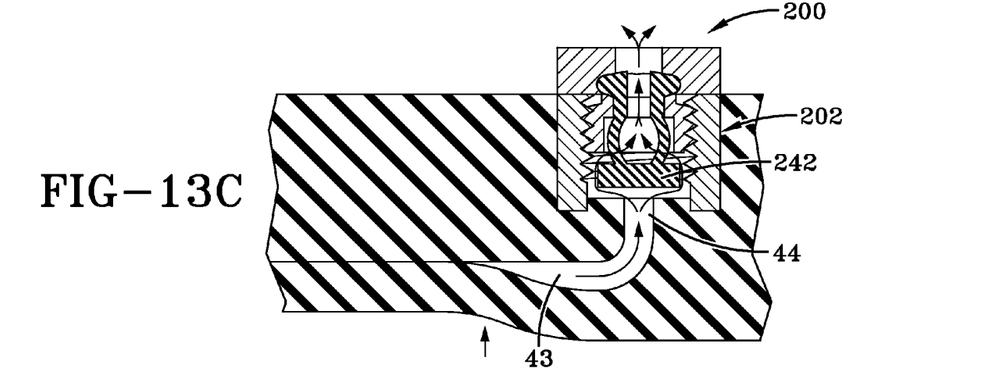

FIGS. 13A-C illustrate the pump outlet valve 200 installed and operational. FIG. 13C illustrates the pump outlet valve 200 in the open position. The disk lower end 242 of the flexible stopper 240 does not seal the pump outlet 44 when the flow direction is towards the pump outlet valve 200. The flow travels through the central passage 215, around and through the legs 244 and exits the passage outlet 217 to the tire cavity. FIG. 13A illustrates the disk lower end 142 of the flexible stopper 140 sealing the pump end 44 so that flow is blocked from flowing to the cavity. This occurs when the pump is not pumping. FIG. 13B illustrates the disk lower end 142 of the flexible stopper 140 being cracked open by the pressure force when the pump starts pumping.

System Operation

As will be appreciated from FIG. 5, the inlet control valve 300 is in fluid communication with the inlet end 42 of the pump passageway 43. As the tire rotates, a footprint is formed against the ground surface. A compressive force F is directed into the tire from the footprint and acts to flatten the pump passageway 43. Flattening of the pump passageway 43 forces the pumped air towards the pump outlet device 200. Any back flow that is directed towards the inlet control valve 300 is blocked from entering the regulator by the regulator check valve 100 as shown in FIG. 10. Due to the increase in pressure at the pump outlet 44, the pressure unseats the disk 242 from the opening of the pump outlet 44, which allows the pumped air to exit the pump outlet device through passage 215 into the tire cavity 40 as shown in FIG. 13C.

The inlet control valve 300 controls the inflow of outside air into the pump. If the tire pressure is low, the membrane 550 in the inlet control valve 300 is responsive to the tire pressure in the tire cavity 40. If the cavity pressure falls below a preset threshold value, the membrane will unseat from the central outlet port 330, allowing outside filtered air to enter the central chamber 320 from passageway 393. Outside air will then enter the first flexible duct 400. The flow then exits the first flexible duct and enters in inlet check valve 100, and then into the pump inlet 42. As the tire rotates, the air flow in the pump is then compressed through the pump and then exits the pump outlet valve 200 into the tire cavity. The pump will pump air with each tire rotation. The pump passageway 43 fills with air when the pump system is not in the footprint.

If the tire pressure is sufficient, the regulator device will block flow from entering the pump inlet. The pressure membrane is responsive to the cavity tire pressure and engages the central port 330 forming a seal which prevents air flow from passing through the regulator device. The pressure membrane material properties are adjusted to have the desired tire pressure settings.

The location of the pump assembly in the tire will be understood from FIGS. 1 and 2. In one embodiment, the pump air passageway 43 is positioned inside the tire sidewall, radially inward from the tire footprint and is thus positioned to be flattened by forces directed from the tire footprint as described above. Although the positioning of the air passageway 43 is specifically shown inside the sidewall area of the tire near the bead region, it is not limited to same, and may be located at any region of the tire that undergoes cyclical compression. The cross-sectional shape of the air passageway 43 may be elliptical or round.

As described above, the length L of the pump passageway may be about the size of the tire's footprint length Z. However, the invention is not limited to same, and may be shorter or longer as desired. For example, the pump length may be any desired length, such as 10 degrees or more. As the length of the pump increases, the pump passageway will need to substantially open and close like a peristaltic pump.

The pump assembly 14 may also be used with a secondary tire pressure monitoring system (TPMS) (not shown) of conventional configuration that serves as a system fault detector. The TPMS may be used to detect any fault in the self-inflation system of the tire assembly and alert the user of such a condition.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
   a tire mounted to a rim, the tire having a tire cavity, first and second sidewalls extending respectively from first and second tire bead regions to a tire tread region;
   an air passageway having an inlet end and an outlet end, the air passageway being composed of a flexible material operative to open and close when the tire rotates,
   a regulator device, the regulator device including a regulator body, wherein the regulator body has an interior chamber; a pressure membrane being mounted in the interior chamber and positioned to open and close an outlet port mounted in the chamber, wherein the pressure membrane is in fluid communication with the tire cavity pressure; wherein the outlet port of the regulator device is in fluid communication with the inlet end of the air passageway; and
   said interior chamber being in fluid communication with an outside air supply;
   wherein the air passageway outlet end is in fluid communication with the tire cavity; wherein a flexible duct having an internal passageway and having a first end in fluid communication with the outlet port of the regulator device, and a second end in fluid communication with the inlet end of the air passageway.

2. The self-inflating tire assembly of claim 1 wherein the regulator body has a distal end, and having an internal passageway that is in fluid communication with the outside air.

3. The self-inflating tire assembly of claim 2 wherein the internal passageway is in fluid communication with the interior chamber.

4. The self-inflating tire assembly of claim 3 wherein a filter is received in the internal passageway.

5. The self-inflating tire assembly of claim 1 wherein the second end of the flexible duct is connected to an inlet check valve.

6. The self-inflating tire assembly of claim 1 wherein the regulator device has a filter.

7. The self-inflating tire assembly of claim 1, wherein the length of the air passageway is about the same as the length of the tire footprint.

8. The self-inflating tire assembly of claim 1, wherein the air passageway is substantially of elliptical in cross-section.

9. The self-inflating tire assembly of claim 1, wherein the air passageway is positioned in the sidewall.

10. The self-inflating tire assembly of claim 1, wherein the air passageway is positioned between a tire bead region and the rim tire mounting surface radially inward of the tire tread region.

11. The self-inflating tire assembly of claim 1, wherein an outlet check valve is located between the outlet of the air passageway and the tire cavity.

* * * * *